June 23, 1942.  A. L. LANGENFELD  2,287,624
SLIDE HOLDER AND MAGAZINE
Filed Oct. 10, 1940

Inventor
Adolph L. Langenfeld
By Ira Milton Jones
Attorney

Patented June 23, 1942

2,287,624

UNITED STATES PATENT OFFICE 2,287,624

SLIDE HOLDER AND MAGAZINE

Adolph L. Langenfeld, New Holstein, Wis.

Application October 10, 1940, Serial No. 360,620

2 Claims. (Cl. 211—41)

This invention relates to three dimension projectors like that forming the subject matter of the copending application of Carl K. Schwartz and Robert V. Brost, Serial No. 323,132, filed March 9, 1940, and refers particularly to the slide magazine and holder therefor.

It is of utmost importance in three dimension slide projection that the two slides of each pair be exactly positioned with relation to the two projection axes so as to insure accurate superimposition of the image of one slide on that of the other. Unless the two images are exactly superimposed clarity suffers and eye strain results.

It is therefore an object of this invention to provide means for supporting the slides in such a way that the two slides of each pair are rigidly and securely held against any relative motion whatsoever, to thus maintain their proper relative positions notwithstanding the automatic and rather rapid transfer of slides from the magazine to projection positions and back to the magazine.

It is also an object of this invention to provide a novel slide magazine by which an entire series or group of slides may be safely filed away and handled as a unit.

Another object of this invention is to provide a novel slide magazine which incorporates spaced supports cooperable with projections on the slide holders for maintaining each pair of slides in a fixed position parallel to and spaced from the adjacent slides, and in such a manner that any one pair of slides may be quickly and easily lifted from its proper position and returned thereto.

Another object of this invention resides in the provision of a simple, inexpensive carrier frame for a pair of slides formed entirely of two simple, identical stampings.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which.

Figure 1:
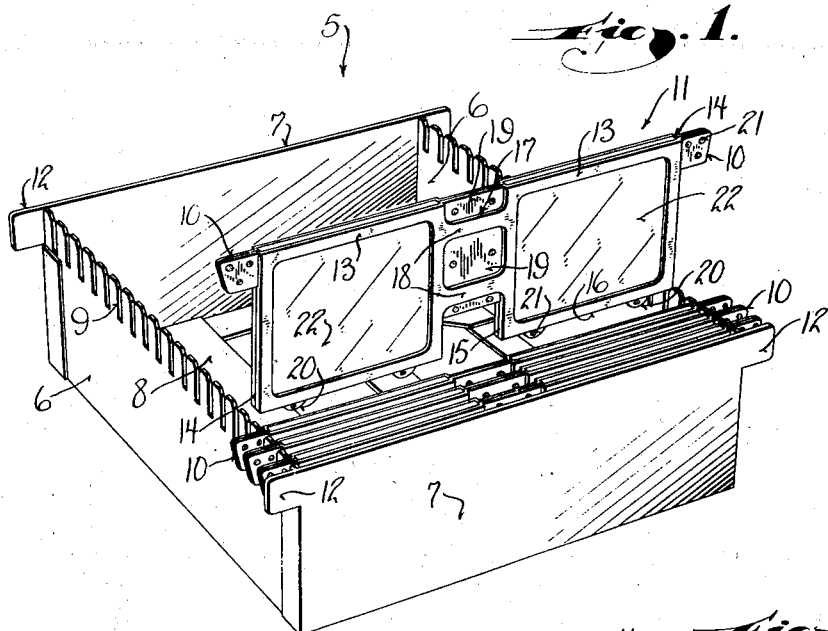
Figure 1 is a perspective view of a slide magazine constructed in accordance with this invention and illustrating one pair of slides lifted therefrom.
Figure 2:
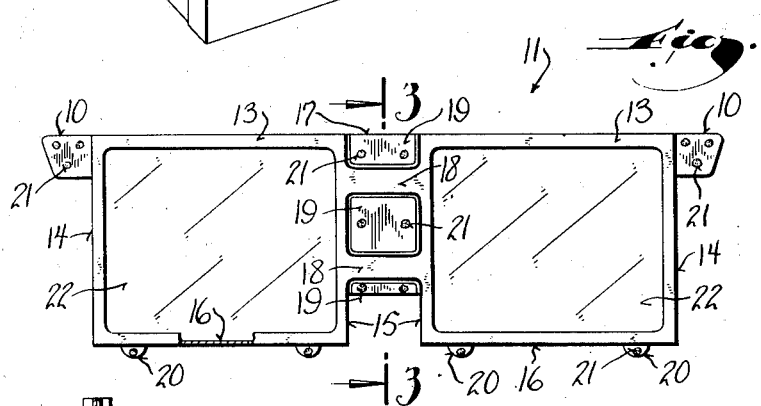
Figure 2 is a plan view of one pair of mounted slides.
Figure 3:
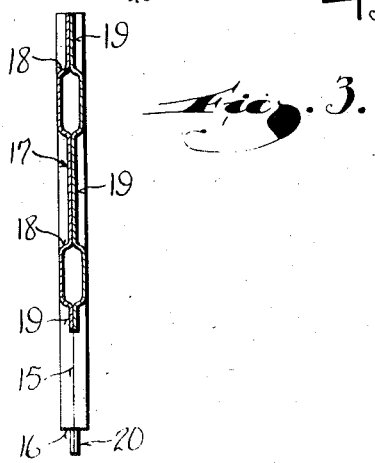
Figure 3 is a cross sectional view taken through Figure 2 on the plane of the line 3—3.

Referring now particularly to the accompanying drawing, the numeral 5 designates generally an open topped box or receptacle which is preferably fabricated from sheet metal and comprises two spaced side walls 6 joined by end walls 7 and provided with a bottom 8.

The upper marginal edge of each side wall 6 has a series of notches 9 formed therein, the notches of one wall being directly opposite those of the other and the prongs or wall portions between the notches preferably having their upper ends rounded or chamfered as illustrated.

The notches 9 are adapted to receive arms or projections 10 extending from the opposite ends of slide holders, indicated generally by the numeral 11. The overall length of the slide holders 11 is slightly less than the distance between the side walls 6 so that the projections or arms 10 are engageable in opposite notches 9.

It is to be observed that the notches are relatively deep and that the arms or projections are likewise substantially wide. Hence, the individual slide holders are held against swinging to preclude adjacent slide holders striking each other as the filled magazine is handled.

The upper end portions of the end walls 7 preferably have extensions 12 formed thereon which align with the arms or projections 10 of the slide holders to protect the same and to provide supports by which the entire filled magazine may be suspended from suitable brackets in storage cabinets or the like.

Each individual slide holder 11 consists of two identical sheet metal stampings secured together in opposed relationship. Each stamping has two frame portions 13 in planar alignment and of a size to define a frame for each slide of the pair to be mounted in the holder. On three sides the outer marginal edges of these frame portions are struck over angularly to provide outer end walls 14, inner end walls 15, and bottom walls 16.

The two frame portions 13 are joined by a bridging portion 17, part of which lies in the plane of the frame portions to provide reinforcing ribs 18 and the remainder of which is offset as at 19 to have one surface thereof disposed in the plane of the marginal edges of the end and bottom walls 14, 15 and 16.

The outer ends of the frame portions have extensions lying in the plane of the offset portions 19 to form the supporting arms 10 and the edges of the bottom walls 16 have tongues 20 extended therefrom and also lying in the plane of the offset portions 19.

Inasmuch as the two stampings are identical, it follows that when they are assembled in opposed relation their offset portions 19, their extensions which form the arms 10, and their lugs 20 engage with a flat surface-to-surface contact so that spot welding 21 may be used to secure these engaging portions of the two stampings together and thus join the two into one rigid structure.

The plane of the flat surface-to-surface contact constitutes the median plane of the entire assembled unit.

The frame portions 13 of the two stampings thus coact to provide two pockets in which slides 22 are received. Inasmuch as these pockets are accurately formed and have a size properly coordinated to that of the slides, it follows that the disposition of the slides in these pockets secures them in proper correlated positions.

Hence no amount of normal handling of the sets of slides while contained in their magazine or during transfer thereof to and from projecting positions will disturb the fixed relationship between the two slides of each pair. It is, of course, to be appreciated that inversion of the entire unit or any one slide holder would permit the slides to fall out of their proper positions, but this would not be normal handling. Moreover it is necessary that the individual slides be removable from the carriers or holders for the sake of replacement of broken or cracked slides.

From the foregoing description taken in connection with the accompanying drawing, it will be readily apparent to those skilled in the art that this invention provides an exceptionally reliable manner of handling the slides for three dimension projectors and that it assures proper relationship between the positions of the two slides of each pair and also guards against breakage resulting from normal handling.

What I claim as my invention is:

1. A slide magazine for three dimension projectors comprising: an open topped receptacle having two spaced parallel walls; a plurality of substantially rectangular slide holders each having two slides mounted therein in definite fixed relative positions; projections extending sidewise outwardly from the upper corners of each slide holder; and means on the said two walls of the receptacle engaging the undersides of the projections and cooperating with the sides of the projections to support the slide holders in the receptacle in positively spaced parallel relationship and against swinging motion about said points of contact between the projections and said means, the projections extending beyond said walls of the receptacle to the exterior thereof so as to be accessible to slide lifting mechanism.

2. A slide magazine for three dimension projectors comprising: an open topped box having spaced substantially parallel side walls, the upper edges of which have spaced notches; a plurality of substantially rectangular slide holders each having a pair of slides mounted therein in side by side definite fixed relative position; and projections extending sidewise outwardly from the upper corners of each slide holder and engageable in opposite notches to readily removably support the slide holders in positive spaced parallel relation within the box, said projections being so proportioned with relation to the depth of the notches in the side walls of the box that the top edges of the slide holders and the box are substantially at the same level.

ADOLPH L. LANGENFELD.